United States Patent
Choi et al.

(10) Patent No.: US 11,904,282 B2
(45) Date of Patent: Feb. 20, 2024

(54) METHOD OF CONTROLLING STRUCTURE OF DEFECTS IN CHABAZITE ZEOLITE MEMBRANES THROUGH LOW TEMPERATURE HEAT TREATMENT

(71) Applicant: KOREA UNIVERSITY RESEARCH AND BUSINESS FOUNDATION, Seoul (KR)

(72) Inventors: Jungkyu Choi, Seoul (KR); Kwan Young Lee, Seoul (KR); Minseong Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 210 days.

(21) Appl. No.: 17/149,823

(22) Filed: Jan. 15, 2021

(65) Prior Publication Data
US 2021/0213393 A1 Jul. 15, 2021

(30) Foreign Application Priority Data
Jan. 15, 2020 (KR) .................. 10-2020-0005590

(51) Int. Cl.
*B01D 67/00* (2006.01)
*B01D 53/22* (2006.01)
(Continued)

(52) U.S. Cl.
CPC ....... *B01D 67/0083* (2013.01); *B01D 53/228* (2013.01); *B01D 67/0051* (2013.01);
(Continued)

(58) Field of Classification Search
None
See application file for complete search history.

(56) References Cited

U.S. PATENT DOCUMENTS

2012/0006194 A1* 1/2012 Falconer ............ B01D 67/0051
95/45
2012/0024777 A1* 2/2012 Sugita ................ B01D 67/0051
427/244
(Continued)

FOREIGN PATENT DOCUMENTS

CN 108579449 A 9/2018
JP 10-506319 A 6/1998
(Continued)

OTHER PUBLICATIONS

Zhang, Ye et al., "Mild template removal of SAPO-34 zeolite membrane in wet ozone environment", Separation and Purification Technology, 228, 2019, 115758. (Year: 2019).*
(Continued)

*Primary Examiner* — Jason M Greene
(74) *Attorney, Agent, or Firm* — NSIP Law

(57) ABSTRACT

The present invention relates to a method of controlling a defect structure in a chabazite (CHA) zeolite membrane, the CHA zeolite membrane having a controlled defect structure by the method and a method of separating $CO_2$, $H_2$, or He and water from a mixture of water and an organic solvent using the CHA zeolite membrane, and more particularly, to a method of controlling a defect structure in a CHA zeolite membrane that improves the separation performance by reducing the amount and size of defects formed in the CHA membrane structure when removing organic-structure-directing agents in the membrane through calcination at a low temperature using ozone.

3 Claims, 8 Drawing Sheets

(51) Int. Cl.

| | |
|---|---|
| *C02F 1/44* | (2023.01) |
| *C01B 39/02* | (2006.01) |
| *C01B 39/48* | (2006.01) |
| *B01J 20/18* | (2006.01) |
| *B01J 20/28* | (2006.01) |
| *B01J 20/30* | (2006.01) |
| *C10L 3/10* | (2006.01) |
| *B01D 69/10* | (2006.01) |
| *B01D 71/02* | (2006.01) |
| *C02F 101/34* | (2006.01) |

(52) U.S. Cl.
CPC ....... *B01D 67/0095* (2013.01); *B01D 69/107* (2022.08); *B01D 69/108* (2022.08); *B01D 71/0281* (2022.08); *B01J 20/183* (2013.01); *B01J 20/28033* (2013.01); *B01J 20/3057* (2013.01); *B01J 20/3078* (2013.01); *C01B 39/026* (2013.01); *C01B 39/48* (2013.01); *C02F 1/44* (2013.01); *C10L 3/104* (2013.01); *C10L 3/105* (2013.01); *C02F 2101/34* (2013.01); *C10L 2290/548* (2013.01)

(56) References Cited

U.S. PATENT DOCUMENTS

| | | | | |
|---|---|---|---|---|
| 2013/0064747 | A1* | 3/2013 | Zhou | B01D 67/0051 502/4 |
| 2014/0352533 | A1* | 12/2014 | Falconer | B01D 71/028 427/244 |
| 2014/0360938 | A1* | 12/2014 | Hayashi | B01D 67/0051 210/500.25 |
| 2016/0114313 | A1* | 4/2016 | Xie | B01D 71/028 423/213.2 |
| 2018/0185792 | A1* | 7/2018 | Choi | B01D 71/028 |
| 2018/0326365 | A1* | 11/2018 | Choi | B01D 67/0051 |
| 2019/0366274 | A1* | 12/2019 | Gu | B01D 53/228 |
| 2020/0147560 | A1* | 5/2020 | Cai | B01D 67/0051 |

FOREIGN PATENT DOCUMENTS

| | | |
|---|---|---|
| JP | 2011-121040 A | 6/2011 |
| JP | 2017-534544 A | 11/2017 |
| JP | 2018-30130 A | 3/2018 |
| JP | 2019-514818 A | 6/2019 |
| JP | 2021-109827 A | 8/2021 |
| KR | 10-2016-0062446 A | 6/2016 |
| KR | 10-2017483 B1 | 9/2019 |
| WO | WO 2013/125661 A1 | 8/2013 |

OTHER PUBLICATIONS

Hang, Samuel et al., "Low-temperature ozone treatment for organic template removal from zeolite membrane", Journal of Membrane Science, 234, 2004, 69-78. (Year: 2004).*

Japanese Office Action dated Jun. 10, 2022, in counterpart Japanese Patent Application No. 2021-004716 (2 pages in English and 3 pages in Japanese).

Den Exter, M. J., et al., "Stability of oriented silicalite-1 films in view of zeolite membrane preparation," *Zeolites,* 19, 1, 1997 (pp. 13-20).

Avila, Adolfo M., et al., "Concentration polarization in SAPO-34 membranes at high pressures," *Journal of Membrane Science,* 335, 1-2, 2009 (pp. 32-36).

Hasegawa, Y., et al., "Preparation of novel chabazite (CHA)-type zeolite layer on porous α-Al2O3 tube using template-free solution," *Journal of membrane science,* 347, 1-2, 2010 (pp. 193-196).

Li, Shiguang, et al., "High-Flux SAPO-34 Membrane for CO2/N2 Separation," *Industrial & engineering chemistry research,* 49, 9, 2010 (pp. 4399-4404).

Batakliev, Todor, et al., "Ozone decomposition," *Interdisciplinary toxicology,* 7, 2, 2014 (pp. 47-59).

Notice of Reasons for Refusal dated Dec. 1, 2021, in counterpart Japanese Patent Application No. 2021-004716 (4 pages in English and 4 pages in Japanese).

Notice of Allowance dated Sep. 9, 2021, in counterpart Korean Patent Application No. 10-2020-0005590 (2 pages in English and 2 pages in Korean).

* cited by examiner

METHOD OF CONTROLLING STRUCTURE OF DEFECTS IN CHABAZITE ZEOLITE MEMBRANES THROUGH LOW TEMPERATURE HEAT TREATMENT

CROSS-REFERENCE TO RELATED APPLICATIONS

This application claims the benefit under 35 USC § 119(a) of Korean Patent Application No. 10-2020-0005590, filed on Jan. 15, 2020, the entire disclosure of which is incorporated herein by reference for all purposes.

TECHNICAL FIELD

The present invention relates to a method of controlling a defect structure in a chabazite (CHA) zeolite membrane. More particularly, the present invention relates to a method of controlling a defect structure in a CHA zeolite membrane that improves the performance of the CHA zeolite membrane to effectively separate $CO_2$ or water from flue gas and biogas containing moisture or water-containing liquid mixtures by reducing the amount and size of defects formed in the CHA membrane structure when removing organic-structure-directing agents in the membrane through calcination at a low temperature using ozone.

BACKGROUND ART

Separation of a mixture using a zeolite membrane is determined by the difference in adsorption and diffusion rates of the material permeating the membrane. In this regard, CHA zeolite having a pore size of $0.37 \times 0.42$ nm$^2$ has a pore structure suitable for separating $CO_2$ having a size of 0.33 nm from $N_2$ (0.364 nm) and $CH_4$ (0.38 nm). The literature reporting the high $CO_2/N_2$ and $CO_2/CH_4$ separation performance of CHA zeolite membranes is as follows (Avila et al., Journal of Membrane Science, 2009, 335, 32-36; Li et al., Industrial and Engineering Chemistry Research, 2010, 49, 4399-4404). In addition, the CHA zeolite membrane can be used for dehydration of various organic substances based on the pervaporation method and can maintain high separation performance even under harsh acidic conditions based on high acid stability (Hasegawa et al., Journal of Membrane Science, 2010, 347, 193-196).

In the process of producing zeolite membranes, it is essential to activate the pores by calcining an organic-structure-directing agent present in the pores at high temperatures. However, additional defects in addition to zeolite pores are formed in the zeolite membrane at high temperatures due to the difference in thermal expansion between the zeolite membrane and the support (den Exter et al., Zeolites, 1997, 19, 13-20). The defects formed at this time usually have a larger pore size than that of zeolite, providing a non-selective passage. Accordingly, zeolite membranes calcined at high temperatures often lose inherent molecular sieve ability thereof and thus have greatly reduced separation performance.

Various studies have been conducted to lower the calcination temperature of the zeolite membrane, and one thereof is calcination in an ozone environment. Ozone is an unstable substance having a short half-life, and releases oxygen radicals when decomposed. Oxygen radicals generated at this time can oxidize and remove the organic-structure-directing agent present in the zeolite structure even at a low temperature.

The half-life of ozone decreases very rapidly at high temperatures. According to the literature, the half-life of ozone is 1.5 hours at 120° C. and decreases greatly to 1.5 seconds at 250° C. (Batakliev et al., Interdiscip Toxicol, 2014, 7, 47-59). Oxygen radicals generated due to the decomposition of ozone are the key oxidizing agents for calcining the organic-structure-directing agents present in the zeolite structure. However, there is a problem in which, when ozone decomposes before reaching the surface of the membrane, the oxygen radicals do not affect the calcination of the organic-structure-directing agents.

Meanwhile, moisture is present in the stream of the flue gas treatment or biogas upgrading that requires selective separation of $CO_2$. Moisture present in the stream of the actual process interferes with the selective adsorption and diffusion for $CO_2$ of the zeolite membrane, thus causing a decrease in $CO_2$ permeance. Therefore, for the practical $CO_2$ separation of the zeolite membrane, it is necessary to measure and evaluate the $CO_2$ separation performance in the presence of moisture like the actual process.

Therefore, as a result of extensive efforts to solve these problems, the present inventors demonstrated that when ozone is contained in feed gas in the process of calcining the CHA membrane, calcination of the organic-structure-directing agents in the pores can be performed at a lower temperature of 150 to 300° C. and thus zeolite membranes that have marked $CO_2$, $H_2$, or He separation performance while controlling defects in the membrane that occur during high-temperature calcination without an additional process can be produced. The present invention has been completed based on this finding.

SUMMARY OF THE INVENTION

Therefore, the present invention has been made in view of the above problems, and it is one objective of the present invention to provide a method of producing a membrane that has marked $CO_2$, $H_2$, or He separation performance without an additional process by controlling defects in the membrane that occur during high-temperature calcination of organic-structure-directing agents of CHA membranes, and a membrane produced by the method.

It is another objective of the present invention to provide a method for separating $CO_2$, $H_2$, or He using the membrane.

It is another objective of the present invention to provide a water, dehydration, or wastewater treatment method including treating water from a mixture containing acid or the like, or an organic solvent using the membrane.

In accordance with one aspect of the present invention, the above and other objectives can be accomplished by the provision of a method of controlling a defect structure of a CHA zeolite membrane, including calcining the CHA zeolite membrane under an ozone atmosphere at a temperature of 150 to 300° C.

In accordance with another aspect of the present invention, there is provided a CHA zeolite membrane having a defect structure controlled to have a defect density of 0.001 to 1% using the method.

In accordance with another aspect of the present invention, there is provided a method of separating $CO_2$, $H_2$, or He from a mixture containing $CO_2$, $H_2$, or He, and a molecule selected from the group consisting of $CH_4$, CO, $SO_2$, $N_2$, $O_2$, $C_2H_4$, $C_2H_6$, $C_3H_6$ and $C_3H_8$ using the CHA zeolite membrane.

In accordance with another aspect of the present invention, there is provided a method of separating water from a mixture containing an acid or an organic solvent using the CHA zeolite membrane.

BRIEF DESCRIPTION OF THE DRAWINGS

The above and other objectives, features and other advantages of the present invention will be more clearly understood from the following detailed description taken in conjunction with the accompanying drawings, in which.

DETAILED DESCRIPTION OF THE INVENTION

Figure 1:
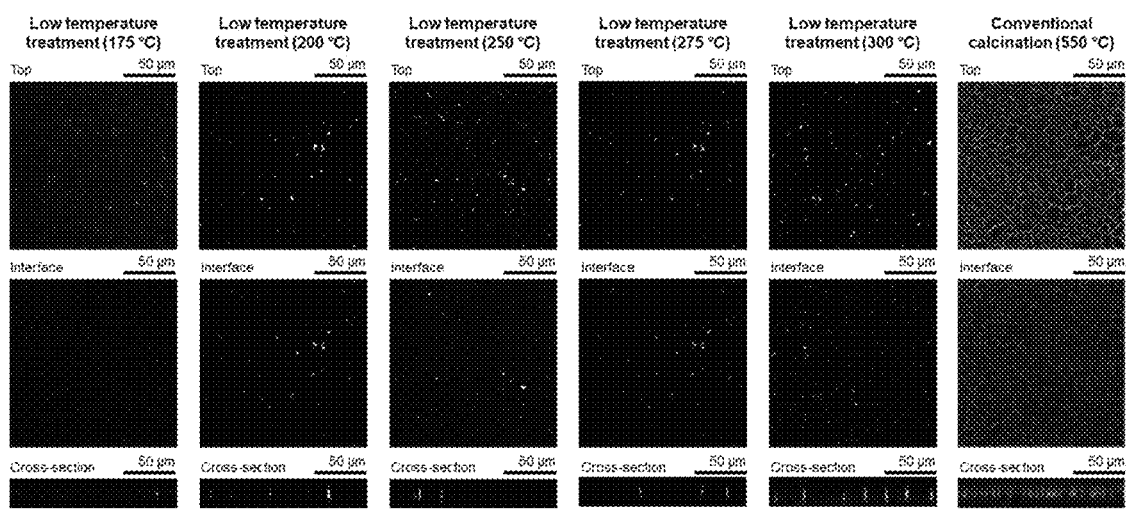
FIG. 1 is a fluorescence confocal optical microscopic image showing a CHA membrane depending on calcination and heat treatment temperatures in an embodiment of the present invention.

Unless defined otherwise, all technical and scientific terms used herein have the same meanings as appreciated by those skilled in the field to which the present invention pertains. In general, the nomenclature used herein is well-known in the art and is ordinarily used.

It was found that, when ozone is contained in feed gas in the process of calcining a CHA membrane, calcination of the organic-structure-directing agents in the pores could be performed at a temperature of 100 to 300° C., which is lower than a conventional calcination process, and thus defects in the membrane occurring during high-temperature calcination could be controlled, and improved carbon dioxide separation performance was obtained.

Thus, in one aspect, the present invention is directed to a method of controlling a defect structure of a CHA zeolite membrane, including calcining the CHA zeolite membrane under an ozone atmosphere at a temperature of 150 to 300° C.

In another aspect, the present invention is directed to a CHA zeolite membrane having a defect structure controlled to have a defect density of 0.001 to 1% using the method.

Hereinafter, the present invention will be described in detail.

Defects of the zeolite membrane mainly occur during calcination at high temperatures. In the present invention, in order to lower the calcination temperature, ozone, which is a strong oxidizing agent, is used to heat-treat the zeolite membrane at a low temperature of 300° C. or less that does not greatly affect the expansion/contraction of the zeolite structure. In this process, the degree of defect formation of the zeolite membrane depending on heat treatment temperature and calcination temperature is detected. For this purpose, the CHA zeolite membrane is synthesized and is heat-treated at a low temperature or conventionally calcined at a high temperature, and then the degree of defect formation is qualitatively detected through a fluorescence confocal optical microscopic (FCOM) image. In addition, the CHA zeolite membrane was found to maintain high separation performance in a specific heat treatment temperature range by measuring the $CO_2/N_2$ and $CO_2/CH_4$ separation performance under a dry or wet condition.

In general, calcination of a CHA membrane is performed at 480 to 600° C. using air as an oxidizing agent. However, when ozone is contained in the feed gas, calcination of the organic-structure-directing agents in the pores can be performed at a much lower temperature (150 to 300° C.) so that defects in the membrane occurring during high-temperature calcination can be controlled. The present invention has an effect of controlling defect structures, not simply removing the defects of the membrane.

In the present invention, the calcination is performed at a temperature of 150 to 300° C., preferably 170 to 280° C., even more preferably, 175 to 275° C.

When calcination is performed in the above temperature range, it is possible to control defects in the membrane occurring during high-temperature calcination.

In the present invention, ozone may be fed in a total amount of 0.05 to 75 vol % at an ozone feeding rate of 0.001 to 1.5 g/min, and calcination may be conducted for 0.5 to 168 hours at a heating ramp rate of 0.1 to 20° C./min. In addition, ozone and oxygen may be fed together.

In the present invention, the CHA zeolite membrane may be produced by adding a secondary growth solution containing an organic-structure-directing agent, $SiO_2:H_2O:Na_2O:Al_2O_3$ at a molar ratio of 1 to 100:100:1000 to 20,000:1 to 500:0 to 50 to a support, on which a CHA seed layer is formed, and then conducting hydrothermal synthesis. The organic-structure-directing agent may include at least one selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantyl ammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide) and cyclohexylamine Preferred is the use of TMAdaOH and/or TEAOH, but the present invention is not limited thereto.

In the present invention, the hydrothermal synthesis may be performed at a temperature of 100 to 200° C. for 12 to 240 hours, and preferably may be performed at a temperature of 110 to 180° C. for 12 to 120 hours. When the hydrothermal synthesis is performed under the temperature and time conditions satisfying the ranges defined above, there is an advantage in that a continuous CHA membrane having a size suitable for gas permeation can be produced.

In the present invention, the hydrothermal synthesis may be performed once or twice, but is not limited thereto.

In the present invention, the method may further include, after the hydrothermal synthesis, drying the membrane at a temperature of 30 to 200° C. for 1 to 24 hours, preferably at a temperature of 50 to 100° C. for 5 to 12 hours.

In the present invention, the support may include at least one selected from the group consisting of alpha-alumina, polypropylene, polyethylene, polytetrafluoroethylene, polysulfone, polyimide, silica, glass, gamma-alumina, mullite, zirconia, titania, yttria, ceria, vanadia, silicon, stainless steel and carbon, but is not limited thereto.

The CHA zeolite membrane according to the present invention is controlled by the method for controlling the defect structure of the zeolite membrane according to the present invention, and thus has a defect density reduced by $1/10000$ to $1/10$ times to achieve a low defect density of 0.001 to 1%, compared to the CHA zeolite membrane subjected to conventional calcination.

Here, the defect density means the ratio of the bright pixels to the total pixels in a processed image and is represented as a percentage (%).

It was found that the CHA zeolite membrane maintains high separation performance in a specific heat treatment temperature range by measuring the separation performance of $CO_2/N_2$ and $CO_2/CH_4$ under a dry or wet condition using the CHA zeolite membrane produced in an embodiment of the present invention. Moreover, it was found that high carbon dioxide separation performance can be maintained regardless of whether moisture is present or not in the feed containing carbon dioxide.

In another aspect, the present invention is directed to a method of separating $CO_2$, $H_2$, or He from a mixture containing $CO_2$, $H_2$, or He, and a molecule selected from the group consisting of $CH_4$, CO, $SO_2$, $N_2$, $O_2$, $C_2H_4$, $C_2H_6$, $C_3H_6$ and $C_3H_8$ using the CHA zeolite membrane.

In the present invention, the mixture may be flue gas, synthesis gas, exhaust gas, natural gas or biogas which contains moisture. High carbon dioxide separation performance can be maintained regardless of whether moisture is present or not in the feed containing carbon dioxide.

In use of the CHA zeolite membrane according to the present invention, separation of carbon dioxide encompasses all of separation, collection, and removal of carbon dioxide.

The CHA zeolite membrane according to the present invention can be used for separation, collection, or removal of various gases such as $H_2$ and He.

In addition, it was found that the CHA zeolite membrane produced in an embodiment of the present invention stably exhibits high dehydration performance from mixtures containing an acid or an organic solvent even under a strongly acidic condition.

In another aspect, the present invention is directed to a method of separating water from a mixture of water and an organic solvent using the CHA zeolite membrane.

In the present invention, the organic solvent is an alcohol, a polar solvent, an aromatic solvent, or a non-polar solvent such as methanol, ethanol, propanol, ethyl lactate, ethylene glycol, propylene glycol monoethyl ether acetate, cyclohexanol, chloroform, acetic acid, lactic acid, formic acid, citric acid, oxalic acid, uric acid, malic acid, acetone, diethyl ether, diethylene glycol dimethyl ether, dimethyl formamide, dimethyl sulfoxide, 1,4-dioxane, glycerol, hexamethylphosphoramide, hexamethylphosphoric triamide, acetonitrile, N-methylpyrrolidine, nitromethane, tetrahydrofuran, triethanolamine, propylene glycol monoethyl ether acetic acid, tetrachloromethane, dichloroethane, methylene chloride, benzene, chlorobenzene, polyaryletherketone, xylene, toluene, pentane, hexane, heptane, or hexamethyldisilazane.

The CHA zeolite membrane according to the present invention can be used for water, dehydration, or wastewater treatment including treating water from a mixture containing acid, etc. or an organic solvent.

Hereinafter, the present invention will be described in more detail with reference to examples. However, it will be obvious to those skilled in the art that these examples are provided only for illustration of the present invention and should not be construed as limiting the scope of the present invention.

EXAMPLE

Example 1: Production of CHA Membranes

CHA seed particles were uniformly deposited on an alpha-alumina support and then a CHA zeolite membrane was synthesized through secondary growth of the seed particles. In this process, a synthetic solution containing, as organic-structure-directing agents, TMAdaOH (N,N,-trimethyladamantylammonium hydroxide) and TEAOH (tetraethylammonium hydroxide) and Si, Al, and alkali metal ion raw materials was prepared in order to conduct hydrothermal synthesis on the seed particles. The support, on which the seed particles were deposited, was added to the prepared synthetic solution and hydrothermal synthesis was conducted to obtain a CHA zeolite membrane.

Example 2: High-Temperature Calcination and Low-Temperature Heat Treatment of CHA Zeolite Membranes The CHA zeolite membrane synthesized in Example 1 (the pores of which are not open yet) was calcined at a conventional high temperature or heat-treated at a low temperature to remove organic-structure-directing agents present in the structure. Conventional high-temperature calcination using air was conducted for 12 hours while flowing air at a rate of 200 mL/min at 550° C., and low-temperature heat treatment using ozone was continuously performed at 150 to 300° C. for 48 hours, while flowing $O_2$ gas at a rate of 1,000 mL/min into an ozone generator in order to form 5 vol % $O_3$.

Example 3: Characterization of CHA Zeolite Membranes

Figure 2:
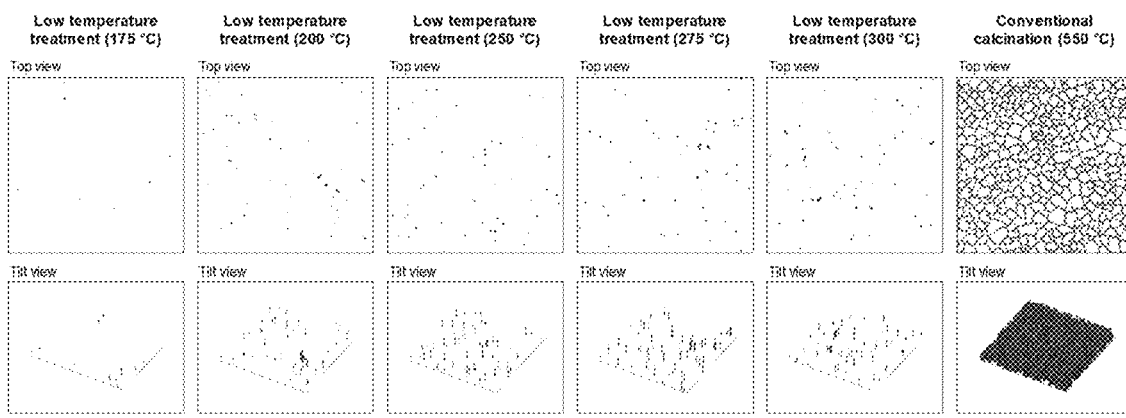
FIG. 2 is an image showing the position of defects obtained through image processing of the fluorescence confocal optical microscopic image measured in an embodiment of the present invention.
Figure 3:
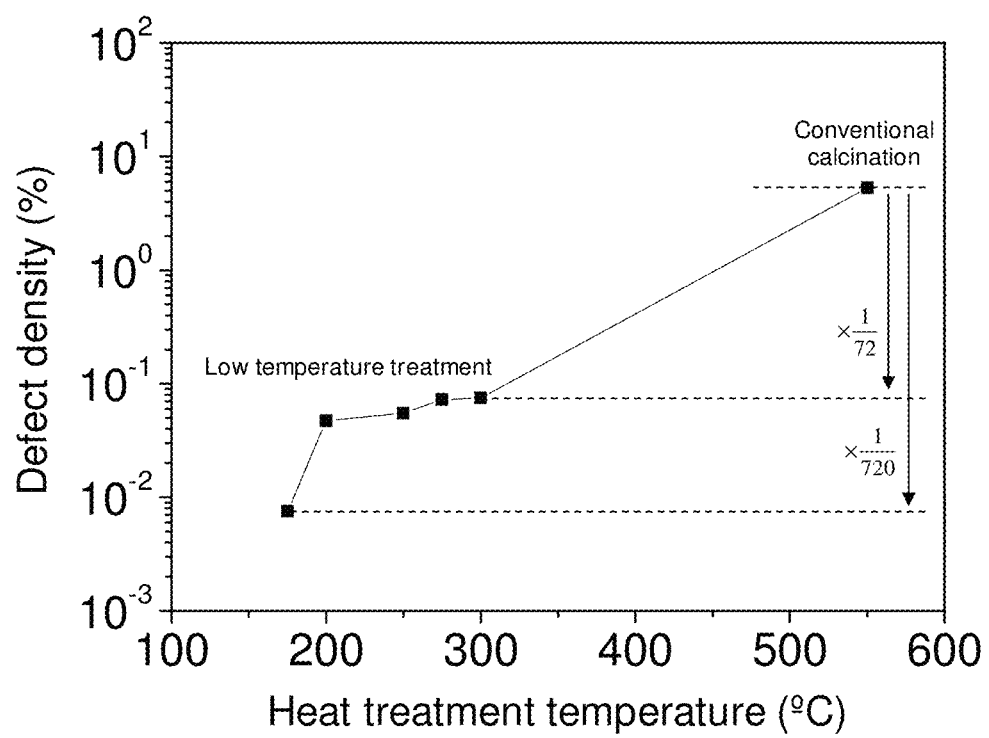
FIG. 3 is a graph showing a defect density of the CHA membrane depending on calcination and heat treatment temperatures in an embodiment of the present invention.

In order to determine the characteristics of the CHA zeolite membrane whose pore was opened by the method of Example 2, fluorescence confocal optical microscopic measurement was performed. When the pore-opened CHA zeolite membrane is dyed with a dye molecule having a size of ~1 nm and then measured with a fluorescence confocal optical microscope, the structure of defects having a size of about 1 nm or more can be observed. The degree of defect formation of the CHA zeolite membrane that was calcined or heat-treated at various temperatures was qualitatively observed via the FCOM measurement (FIG. 1). In addition, in order to observe the defects more precisely, the FCOM image was further image-processed to locate the defects of the CHA zeolite membrane (FIG. 2). As a result of the analysis, the CHA zeolite membrane that has undergone conventional high-temperature calcination has a defect density of 5.3% due to the formation of continuous crack-type defects, whereas the CHA zeolite membrane that has undergone ozone-based low-temperature heat treatment has far fewer defects and the defects were revealed to have scattered point-type defects (rather than a continuous crack) with a defect density of 0.007 to 0.07%. The defect density refers to the ratio of the defective pixels (bright portions) of FIG. 2 to the total pixels. The defect density of CHA membranes as a function of the heat treatment temperature is summarized in FIG. 3.

Figure 4:
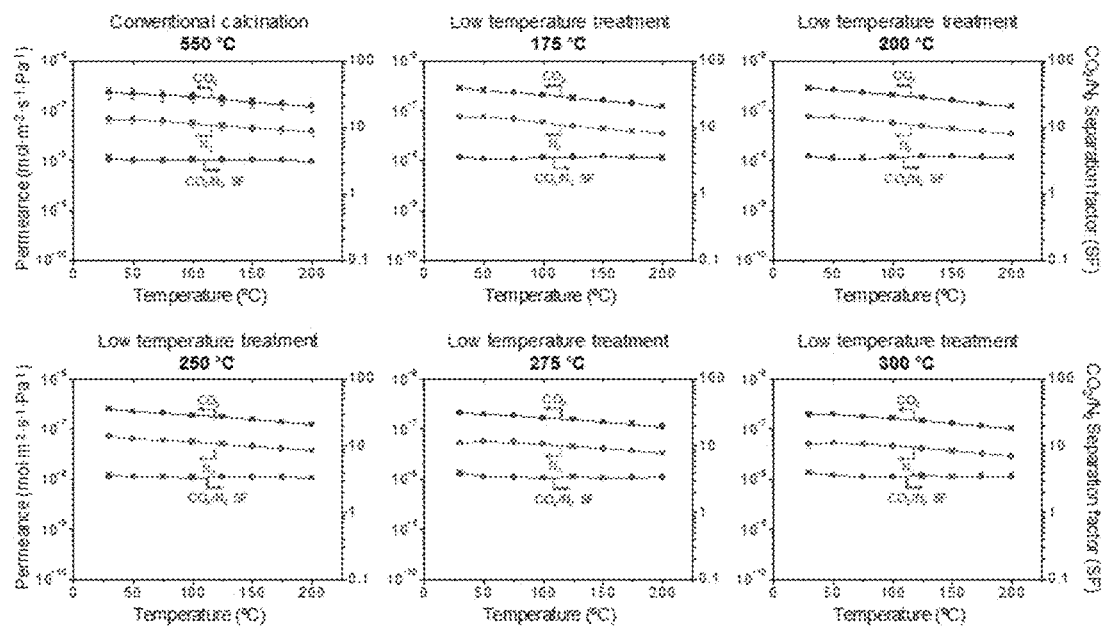
FIG. 4 is a graph showing the $CO_2/N_2$ separation performance under a dry condition of a CHA membrane depending on calcination and heat treatment temperatures in an embodiment of the present invention.
Figure 5:
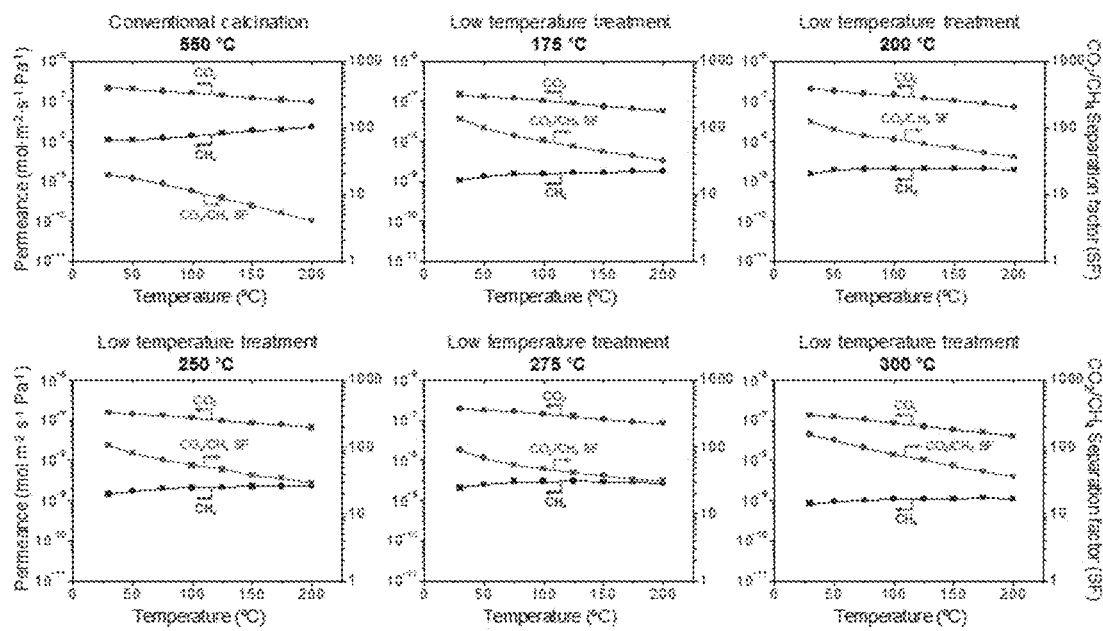
FIG. 5 is a graph showing the $CO_2/CH_4$ separation performance under a dry condition of the CHA membrane depending on calcination and heat treatment temperatures in an embodiment of the present invention.
Figure 6:
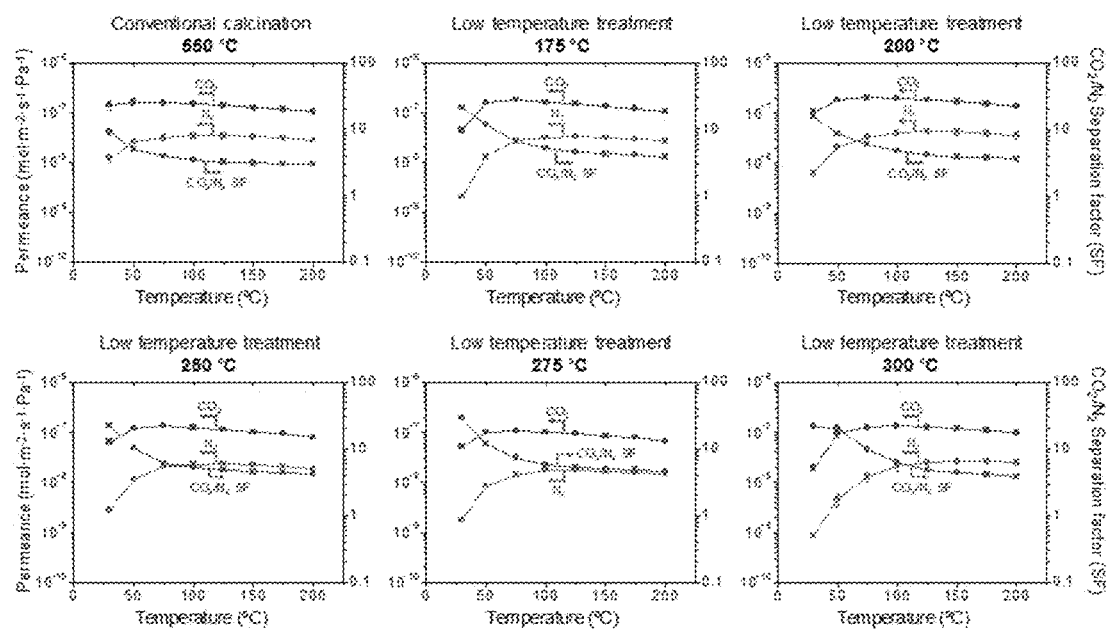
FIG. 6 is a graph showing the $CO_2/N_2$ separation performance under a wet condition of the CHA membrane depending on calcination and heat treatment temperatures in an embodiment of the present invention.
Figure 7:
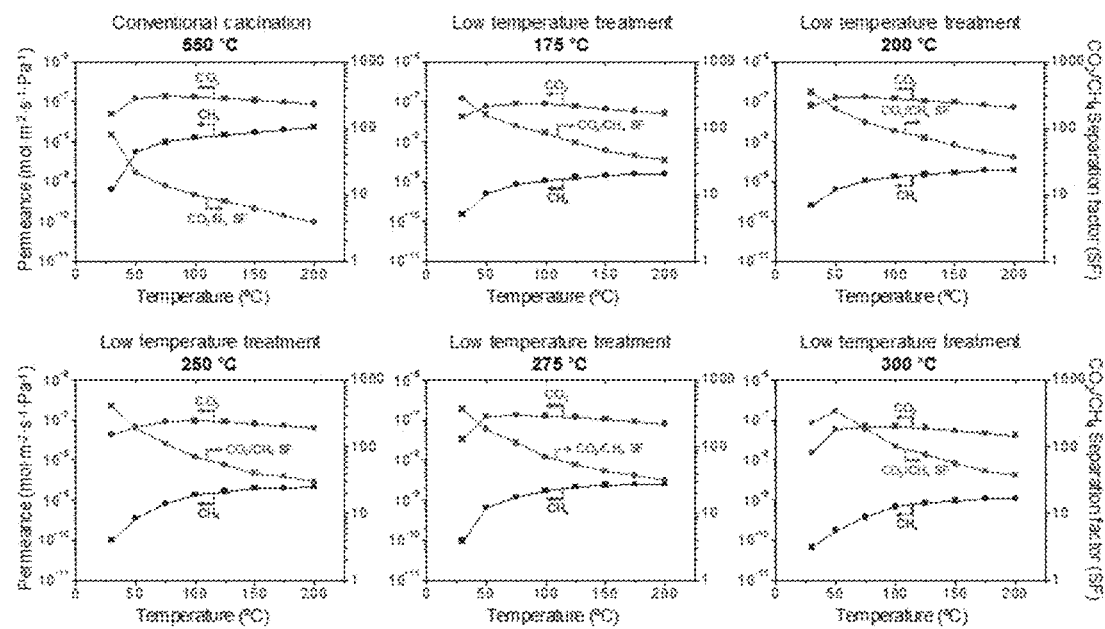
FIG. 7 is a graph showing the $CO_2/CH_4$ separation performance under a wet condition of the CHA membrane depending on calcination and heat treatment temperatures in an embodiment of the present invention.

Example 4: Analysis of $CO_2$ Separation Characteristics of CHA Zeolite Membranes The ozone-based low-temperature heat-treated CHA membrane exhibited a maximum $CO_2/N_2$ separation factor of 4 with respect to dry $CO_2/N_2$ mixtures (FIG. 4), and a maximum $CO_2/CH_4$ separation factor of 400 with respect to dry $CO_2/CH_4$ mixtures (FIG. 5). These correspond to improved values compared to those of the CHA membrane subjected to conventional high-temperature calcination which exhibited maximum $CO_2/N_2$ and $CO_2/CH_4$ separation factors of 3 and 20 under a dry condition, respectively. The ozone-based low-temperature heat-treated CHA membrane exhibited a maximum $CO_2/N_2$ separation factor of 15 or more with respect to wet $CO_2/N_2$ mixtures (FIG. 6), and a maximum $CO_2/CH_4$ separation factor of 200 or more with respect to wet $CO_2/CH_4$ mixtures (FIG. 7). These correspond to improved values compared to those of the CHA membrane subjected to conventional high-temperature calcination exhibiting maximum $CO_2/N_2$ and $CO_2/CH_4$ separation factors of 10 and 100 under a wet condition, respectively.

Figure 8:
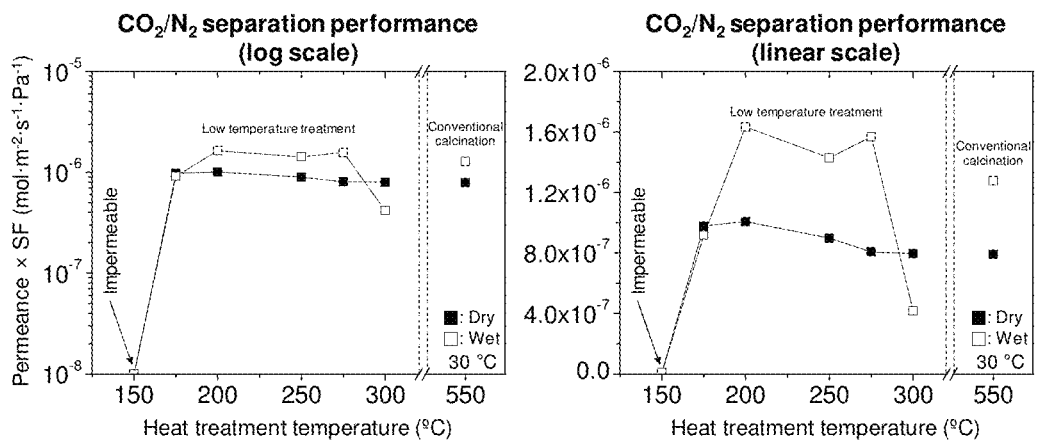
FIG. 8 is a graph showing a change in $CO_2/N_2$ separation performance at 30° C. of the CHA membrane depending on heat treatment temperature in an embodiment of the present invention.
Figure 9:
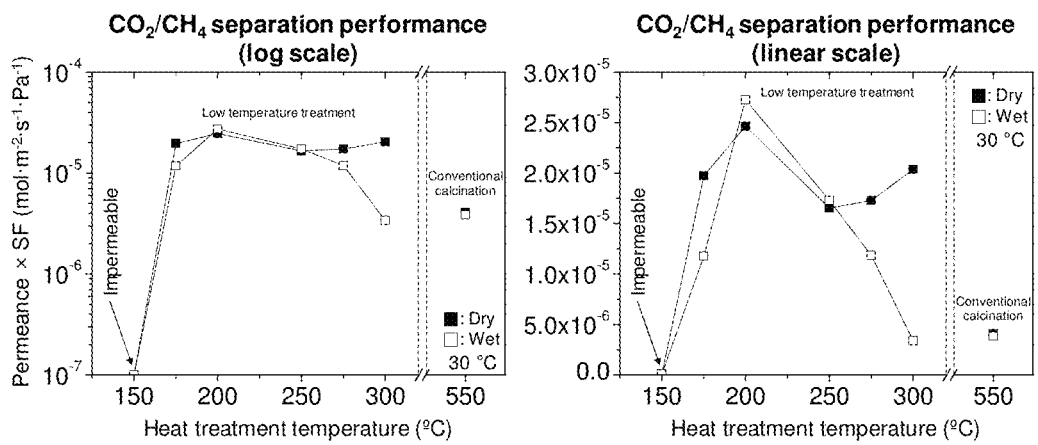
FIG. 9 is a graph showing a change in $CO_2/CH_4$ separation performance at 30° C. of the CHA membrane depending on heat treatment temperature in an embodiment of the present invention.

Example 5: Analysis of $CO_2$ Separation Characteristics of CHA Zeolite Membranes Under Dry Conditions The $CO_2/N_2$ and $CO_2/CH_4$ separation performances under a dry condition were analyzed and are shown in FIG. 4 (related to flue gas) and FIG. 5 (related to biogas), and the results at 30° C. are summarized in FIGS. 8 and 9, respectively. In the range of the ozone-based heat treatment temperature from 175 to 300° C., $CO_2$ permeance×separation factor (SF) is $(8.0 \text{ to } 10) \times 10^{-7}$ $mol \cdot m^{-2} \cdot s^{-1} \cdot Pa^{-1}$ for the $CO_2/N_2$ separation, and $(1.7 \text{ to } 2.5) \times 10^{-5}$ $mol \cdot m^2 \cdot Pa^{-1}$ for the $CO_2/CH_4$ separation. This improved $CO_2/CH_4$ separation performance corresponds to a value that is 4 to 6 times higher than the $CO_2/CH_4$ separation performance of the CHA membrane subjected to the conventional high-temperature calcination.

Example 6: Analysis of $CO_2$ Separation Characteristics of CHA Zeolite Membranes Under Wet Conditions The $CO_2/N_2$ and $CO_2/CH_4$ separation performances under a wet condition were analyzed and are shown in FIG. 6 (related to flue gas) and FIG. 7 (related to biogas), and the results at 30° C. are also summarized in FIGS. 8 and 9, respectively. $CO_2$ permeance×separation factor (SF) for the $CO_2/N_2$ and $CO_2/CH_4$ separation performances of the CHA membranes with the ozone-based heat treatment at 175 to 275° C. was $(9.2 \text{ to } 16) \times 10^{-7}$ $mol \cdot m^{-2} \cdot s^{-1} \cdot Pa^{-1}$ for the $CO_2/N_2$ separation and $(1.2 \text{ to } 3.4) \times 10^{-5}$ $mol \cdot m^{-2} \cdot s^{-1} \cdot Pa^{-1}$ for the $CO_2/CH_4$ separation, which are higher than results of the CHA membranes with the ozone-based heat treatment at other temperatures (i.e., 150 and 300° C.). The improved $CO_2/CH_4$ separation performance corresponds to a value that is 3 to 7 times higher than the $CO_2/CH_4$ separation performance of the CHA membrane subjected to the conventional high-temperature calcination.

Figure 10:
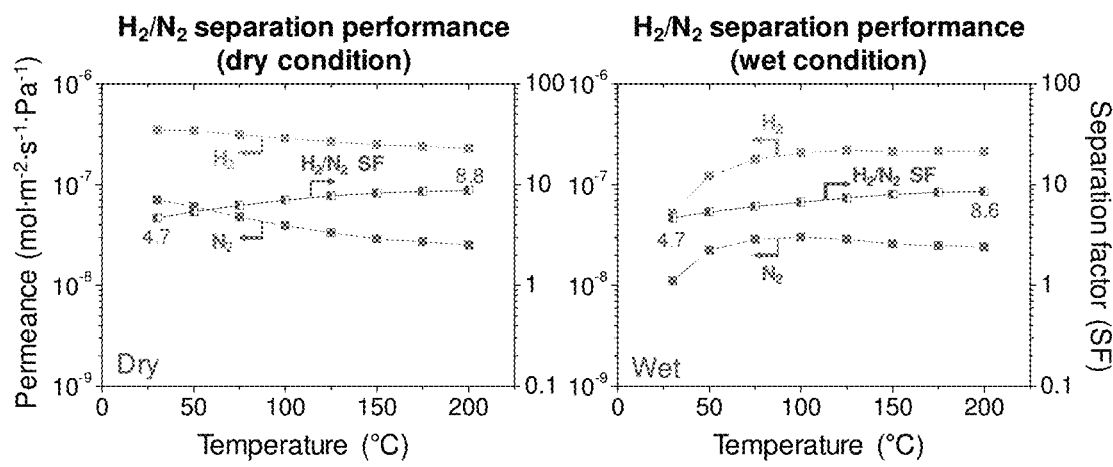
FIG. 10 is a graph showing $H_2/N_2$ separation performance depending on temperature under dry and wet conditions of the CHA membrane subjected to low-temperature heat treatment in an embodiment of the present invention.

Example 7: Analysis of $H_2/N_2$ Separation Characteristics Under Dry and Wet Conditions of CHA Zeolite Membrane The $H_2/N_2$ separation performance of the ozone-based low-temperature heat-treated CHA membrane under a dry or wet condition was analyzed and is shown in FIG. 10. The CHA membrane exhibited a $H_2/N_2$ separation factor of 4.7 at 30° C. under a dry condition. As the temperature increased, the $H_2/N_2$ separation factor under a dry condition gradually increased and was 8.8 at 200° C. The $H_2/N_2$ separation factor was 4.7 at 30° C. under a wet condition. The $H_2/N_2$ separation factor under a wet condition gradually increased as the temperature increased and was 8.6 at 200° C.

Figure 11:
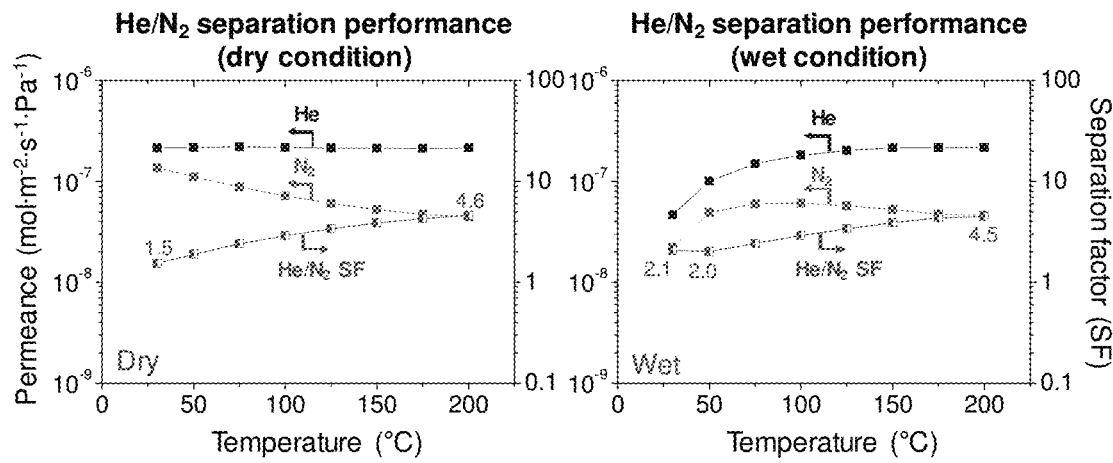
FIG. 11 is a graph showing $He/N_2$ separation performance depending on temperature under dry and wet conditions of the CHA membrane subjected to low-temperature heat treatment in an embodiment of the present invention.

Example 8: Analysis of $He/N_2$ Separation Characteristics Under Dry and Wet Conditions of CHA Zeolite Membrane The $He/N_2$ separation performance of the ozone-based low-temperature heat-treated CHA membrane under a dry or wet condition was measured and is shown in FIG. 11. The CHA membrane exhibited a $He/N_2$ separation factor of 1.5 at 30° C. under a dry condition. As the temperature increased, the $He/N_2$ separation factor under a dry condition gradually increased and was 4.6 at 200° C. The $He/N_2$ separation factor was 2.1 at 30° C. under a wet condition. The $He/N_2$ separation factor under a wet condition gradually increased as the temperature increased and was 4.5 at 200° C.

Figure 12:
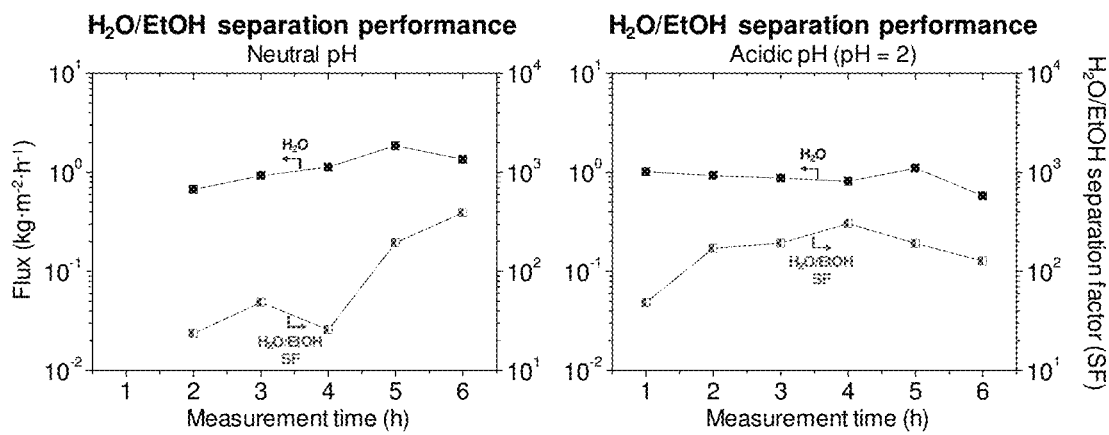
FIG. 12 is a graph showing $H_2O$/ethanol separation performance under neutral and acidic conditions of ozone-treated CHA membranes in an embodiment of the present invention.

Example 9: Analysis of Ethanol Dehydration Ability of CHA Zeolite Membrane Under Neutral and Acidic Conditions The ethanol dehydration ability of the ozone-based low-temperature heat-treated CHA zeolite membrane under neutral and acidic conditions was measured and is shown in FIG. 12. The water/ethanol mixture is composed of 15-25% water and 75-85% ethanol and in the case of an acid condition, the pH was adjusted to 2 by further adding citric acid thereto. The temperature was maintained at 80 to 100° C. The membrane exhibited water flux of 1.0 to 2.5 kg·m$^{-2}$·h$^{-1}$ under neutral and acidic conditions and marked dehydration performance with high $H_2O$ purity at a high $H_2O$/EtOH separation factor of 1,600 to 2,000. In particular, the CHA zeolite membrane stably maintained high dehydration performance even under strongly acidic conditions of pH 2 to 3 for 6 hours.

Example 10: Analysis of Acetic Acid Dehydration Ability of CHA Zeolite Membrane

Figure 13:
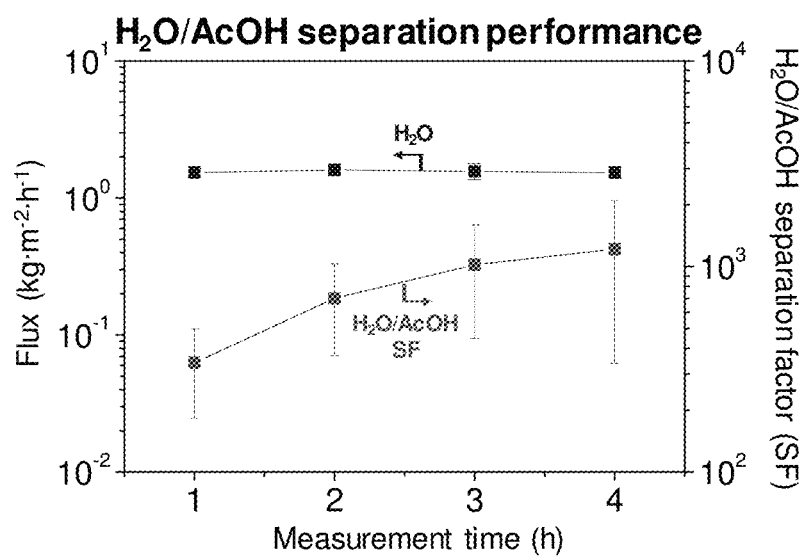
FIG. 13 is a graph showing $H_2O$/acetic acid separation performance of ozone-treated CHA membranes in an embodiment of the present invention.

The acetic acid dehydration ability of the ozone-based low-temperature heat-treated CHA zeolite membrane under acidic conditions was analyzed and shown in FIG. 13. The water/acetic acid mixture is composed of 10-15% water and 85-90% acetic acid. The temperature was maintained at 100° C. The membrane exhibited water flux of 1.3 to 1.8 kg·m$^{-2}$·h$^{-1}$ under acidic conditions and marked dehydration performance with high $H_2O$ purity at a high $H_2O$/acetic acid separation factor of 300 to 900. In particular, the CHA zeolite membrane stably maintained high acetic acid dehydration performance even under strongly acidic conditions of pH 2 for 4 hours.

Figure 14:
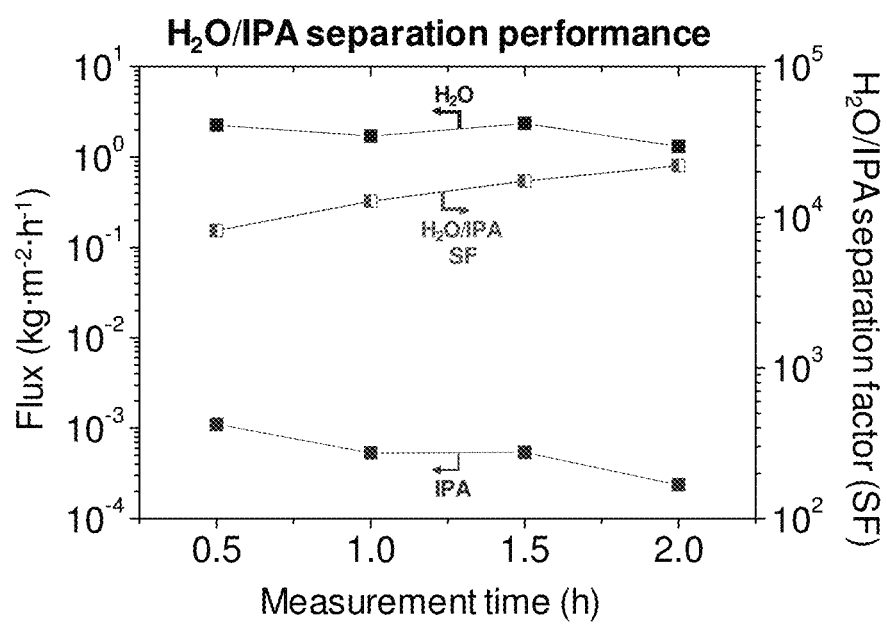
FIG. 14 is a graph showing $H_2O$/isopropyl alcohol separation performance of ozone-treated CHA membranes in an embodiment of the present invention.

Example 11: Analysis of IPA (Isopropyl Alcohol) Dehydration Ability of CHA Zeolite Membrane The IPA dehydration ability of the ozone-based low-temperature heat-treated CHA zeolite membrane was measured and is shown in FIG. 14. The $H_2O$/IPA mixture is composed of 20% water and 80% IPA. The temperature was maintained at 70° C. The membrane exhibited water flux of 1.3 to 2.4 kg·m$^{-2}$·h$^{-1}$ and marked dehydration performance with high $H_2O$ purity at a high $H_2O$/IPA separation factor of 8,000 to 22,000.

INDUSTRIAL APPLICABILITY

The present invention provides a method for controlling the size and amount of defects in the membrane formed during calcination in the process of producing the zeolite membrane. The method is capable of reducing the amount of defects formed in the high-temperature process via calcination at a low temperature compared to a conventional calcination method.

The present invention has effects of minimizing the formation of defects by heat-treating the zeolite membrane at a low temperature of 300° C. or less, which does not greatly affect the expansion/contraction of the zeolite structure, with help of ozone as a strong oxidizing agent. In addition, the present invention is able to improve the $CO_2$/$N_2$, $CO_2$/$CH_4$, $H_2$/$N_2$, He/$N_2$, $H_2O$/ethanol, $H_2O$/acetic acid, and $H_2O$/isopropyl alcohol separation performance of the zeolite membrane.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of separating $CO_2$ from a mixture gas comprising:
   flowing the mixture gas through a CHA zeolite membrane;
   separating the $CO_2$ from the mixture gas; and
   collecting the separated $CO_2$,
   wherein the mixture gas comprises $CO_2$ and a molecule selected from the group consisting of $CH_4$, CO, $SO_2$, $N_2$, $O_2$, $C_2H_4$, $C_2H_6$, $C_3H_6$ and $C_3H_8$,
   wherein the CHA zeolite membrane is prepared by a method comprising calcining the CHA zeolite membrane under an ozone atmosphere at a temperature of 150 to 300° C., and
   wherein the mixture gas is flue gas, synthesis gas, or exhaust gas, which comprises moisture.

2. A method of separating $H_2$ from a mixture gas comprising:
   flowing the mixture gas through a CHA zeolite membrane;
   separating the $H_2$ from the mixture gas; and
   collecting the separated $H_2$,
   wherein the mixture gas comprises $H_2$ and a molecule selected from the group consisting of $CH_4$, CO, $SO_2$, $N_2$, $O_2$, $C_2H_4$, $C_2H_6$, $C_3H_6$ and $C_3H_8$,
   wherein the CHA zeolite membrane is prepared by a method comprising calcining the CHA zeolite membrane under an ozone atmosphere at a temperature of 150 to 300° C., and
   wherein the mixture is flue gas, synthesis gas, exhaust gas, natural gas, or biogas, which comprises moisture.

3. A method of separating He from a mixture gas comprising:
   flowing the mixture gas through a CHA zeolite membrane;
   separating the He from the mixture gas; and
   collecting the separated He,
   wherein the mixture gas comprises He and a molecule selected from the group consisting of $CH_4$, CO, $SO_2$, $N_2$, $O_2$, $O_2H_4$, $O_2H_6$, $O_3H_6$ and $C_3H_5$,
   wherein the CHA zeolite membrane is prepared by a method comprising calcining the CHA zeolite membrane under an ozone atmosphere at a temperature of 150 to 300° C., and
   wherein the mixture is flue gas, synthesis gas, exhaust gas, natural gas, or biogas, which comprises moisture.

* * * * *